(12) United States Patent
Bianconi et al.

(10) Patent No.: US 8,150,394 B2
(45) Date of Patent: Apr. 3, 2012

(54) METHODS, SYSTEMS, AND COMPUTER PROGRAM PRODUCTS FOR SYNCHRONIZING SUBSCRIBER FEATURE DATA ACROSS MULTIPLE DOMAINS

(75) Inventors: Richard J. Bianconi, Rowlett, TX (US); Aziz A. Tejani, McKinney, TX (US); Phil Chiu, Plano, TX (US); Donald Wallace, Fairview, TX (US); Dan R. McClure, Farmers Branch, TX (US)

(73) Assignee: Genband US LLC, Plano, TX (US)

( * ) Notice: Subject to any disclaimer, the term of this patent is extended or adjusted under 35 U.S.C. 154(b) by 1101 days.

(21) Appl. No.: 12/021,982

(22) Filed: Jan. 29, 2008

(65) Prior Publication Data

US 2009/0029697 A1 Jan. 29, 2009

Related U.S. Application Data

(60) Provisional application No. 60/898,079, filed on Jan. 29, 2007.

(51) Int. Cl.
*H04W 4/00* (2009.01)
*H04L 12/66* (2006.01)

(52) U.S. Cl. .................. 455/435.1; 455/432.3; 370/352; 370/354

(58) Field of Classification Search .................. 370/352, 370/354; 455/445, 432.3, 435.1, 436
See application file for complete search history.

(56) References Cited

U.S. PATENT DOCUMENTS

| | | | |
|---|---|---|---|
| 2004/0185899 A1 | 9/2004 | Hayem et al. | |
| 2005/0085225 A1 | 4/2005 | Benco et al. | |
| 2005/0272406 A1 | 12/2005 | Mizikovsky et al. | |
| 2006/0080363 A1 | 4/2006 | Vadlamani et al. | |
| 2006/0259523 A1 | 11/2006 | Wallis et al. | |
| 2006/0286984 A1* | 12/2006 | Bonner | 455/445 |
| 2007/0183395 A1* | 8/2007 | Balyan et al. | 370/352 |

FOREIGN PATENT DOCUMENTS

WO  WO 2008/094579 A1  8/2008

OTHER PUBLICATIONS

Milinski et al., Service Synchronization zwischen CS domain und IMS, Jan. 10, 2006.*
Chinese Official Action for Chinese Patent Application No. 200880010771.1 (Nov. 15, 2010).
Notification of Transmittal of the International Search Report and the Written Opinion of the International Searching Authority, or the Declaration for International Application No. PCT/US08/01200 (May 16, 2008).
Communication of European publication number and information on the application of Article 67(3) EPC for European Application No. 08724946.2 (Oct. 21, 2009).

* cited by examiner

*Primary Examiner* — Jinsong Hu
*Assistant Examiner* — Opiribo Georgewill
(74) *Attorney, Agent, or Firm* — Jenkins, Wilson, Taylor & Hunt, P.A.

(57) ABSTRACT

Methods, systems, and computer program products for synchronizing a subscriber profile in a plurality of domains is described. In one embodiment, the method includes receiving a profile update request message from an application server to modify an Internet protocol (IP) domain subscriber profile. The profile update request message is forwarded to a home location register (HLR). A cellular domain subscriber profile is modified in accordance with the profile update request message. Similarly, an updated subscriber profile data is received from the HLR. The updated subscriber profile data is converted in the IP domain. The converted updated subscriber profile data is sent to the application server.

15 Claims, 6 Drawing Sheets

METHODS, SYSTEMS, AND COMPUTER PROGRAM PRODUCTS FOR SYNCHRONIZING SUBSCRIBER FEATURE DATA ACROSS MULTIPLE DOMAINS

RELATED APPLICATIONS

This application claims the benefit of U.S. Provisional Patent Application Ser. No. 60/898,079 filed Jan. 29, 2007; the disclosure of which is incorporated herein by reference in its entirety.

TECHNICAL FIELD

The subject matter described herein relates to data synchronization in a fixed mobile convergence (FMC) solution. More particularly, the subject matter described herein relates to methods, systems, and computer program products for synchronizing subscriber profile data across a plurality of domains, e.g., cellular and Internet Protocol (IP) domains.

BACKGROUND

Fixed Mobile Convergence (FMC) solutions, which provide both fixed IP-based land line and cellular telephony services, are becoming increasingly popular. Specifically, the goal is to provide both services to a single dual-mode mobile device, e.g., a mobile phone, which is capable of switching between networks on an ad hoc basis. Although convergence of the two services is desired, it is still common practice to maintain subscriber profiles on separate domains due to the lack of synchronization communication between the two domains. Practically speaking, a change made to a subscriber profile in the IP domain is not reflected in the cellular domain. The situation is problematic because subscribers utilizing communication devices supported by both the Internet Protocol (IP) domain and cellular domain occasionally need to update specific feature data, such as a call-forwarding number. Consequently, a user must remember to manually update a subscriber profile in both domains on separate instances (i.e., update the first domain at the present time, then update the other upon the eventual migration to the second domain). This lack of subscriber profile coordination and synchronization can result in different service behaviors across the two domains because a subscriber may not migrate to the second domain until after a considerable amount of time has passed and, thus, the user may have forgotten the original subscriber profile modification. This is an impractical solution and exposes FMC service control limitations to subscribers.

In an alternate scenario, subscriber profile coordination and synchronization is accomplished by eliminating the use of the home location register (HLR) for service control. This solution essentially places complete reliance on an application server, which resides in the IP domain. Although this scenario provides service control transparency, it is a much more complex solution since the user must have access to the application server in the IP domain in order to make subscriber profile changes, even in instances where the mobile device is located in the cellular domain. In addition, the cellular network must be capable of transmitting mid-call service control events (such as flash-hook) to the application server, which cannot always be accomplished due to inherent technical difficulties.

Accordingly, there exists a need for improved methods, systems, and computer program products for synchronizing subscriber feature data and profiles across the IP and cellular domains.

SUMMARY

According to one aspect, the subject matter described herein comprises methods, systems, and computer program products for synchronizing subscriber feature data across multiple domains. One method includes receiving a profile update request message from an application server to modify an Internet protocol (IP) domain subscriber profile. The profile update request message is forwarded to a home location register (HLR). A cellular domain subscriber profile is modified in accordance with the profile update request message. Similarly, an updated subscriber profile data is received from the HLR. The updated subscriber profile data is converted in the IP domain. The converted updated subscriber profile data is sent to the application server.

The subject matter described herein for synchronizing subscriber feature data across multiple domains may be implemented using a computer program product comprising computer executable instructions embodied in a tangible computer readable medium that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for synchronizing subscriber feature data across multiple domains described herein. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

The present subject matter relates to systems and methods for synchronizing subscriber profile data across multiple domains. In a Fixed Mobile Convergence (FMC) solution, a user is capable of receiving service on a plurality of domains, each of which supports a subscriber profile associated with the user's mobile device (e.g., a dual-mode mobile phone). Each subscriber profile may contain a plurality of service features that are subscriber specific and may be modified by the user via the mobile device. However, once the subscriber profile is changed in one domain, the change of feature data needs to be synchronized across the other domain(s) in order to maintain the integrity of that particular service feature. For example, if a call forwarding feature is modified in the Internet Protocol (IP) domain, the same change should be made contemporaneously in the cellular domain. It is the goal of the present subject matter to support customer features provided in a FMC solution without regard to time and the location of a subscriber.

Figure 1:
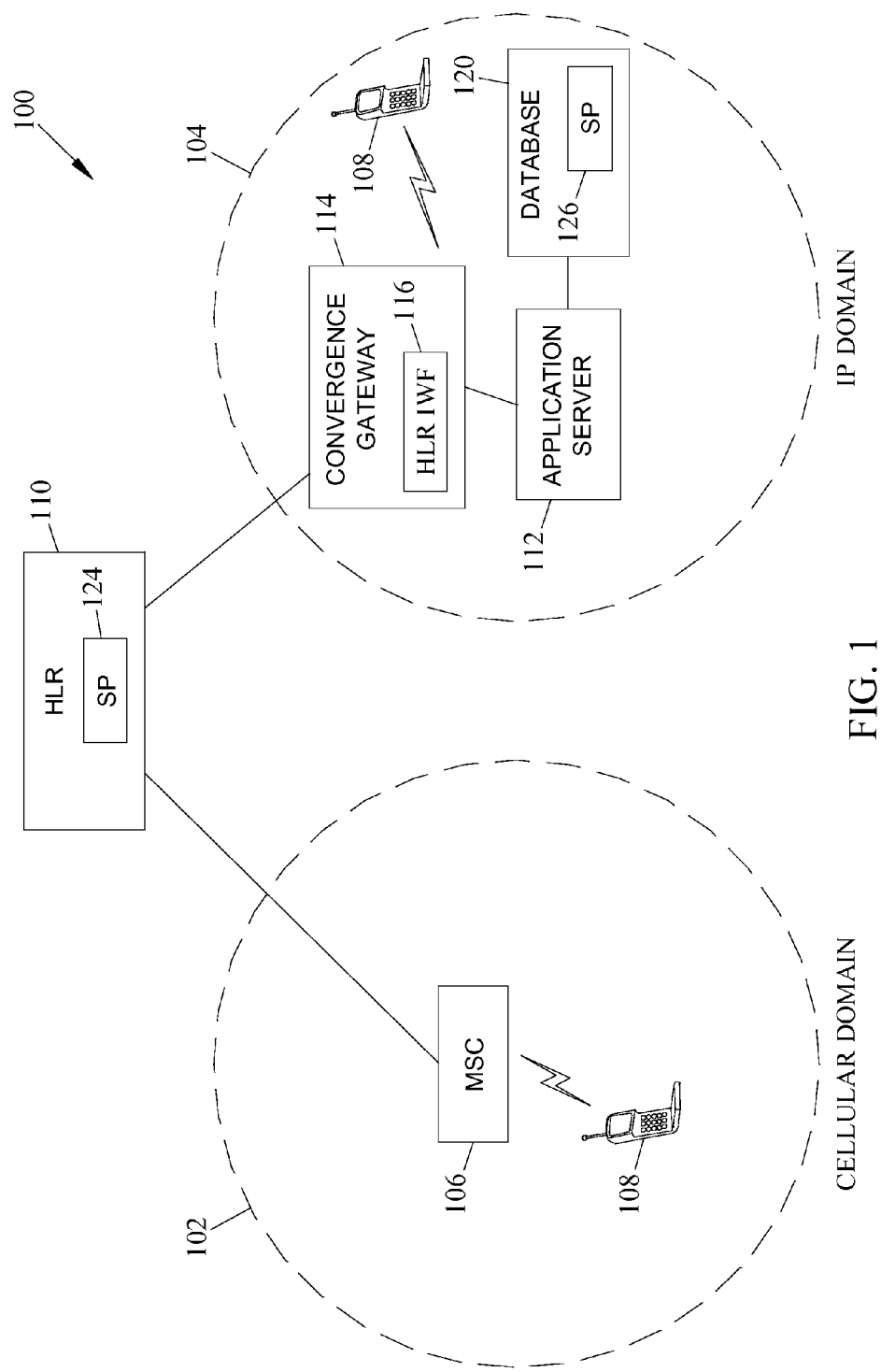
FIG. 1 is a system diagram depicting an exemplary communications network that comprises a plurality of domains according to an embodiment of the subject matter described herein.

FIG. 1 depicts an exemplary communications network 100 that comprises a plurality of domains. In one particular embodiment, communications network 100 may include a cellular domain 102 and an Internet Protocol (IP) domain 104, both of which are capable of supporting a dual-mode mobile device 108. Notably, mobile device 108 may be a dual-mode handset client that is capable of operating in both cellular and IP domains. In one embodiment, a dual-mode handset client may be capable of registering preferences on the handset (e.g., WiFi only, WiFi preferred, cellular only, and cellular preferred), extracting a mobile terminal identification number (e.g., IMSI/MSISDN (GSM) or MIN/MDN (CDMA)) from internal storage, sending a SIP REGISTER message including IMSI/MSISDN (GSM) or MIN/MDN (CDMA) to convergence gateway 114, supporting an integrated authentication procedure, refreshing a registration based upon an "Expires" timer, supporting single registration (at any given instance) towards an FMC network (i.e., if in cellular, register via cellular access; if in WiFi, register via WiFi access).

Cellular domain 102 may comprise any number of geographic regions, or cells, that provide wireless telephony service. Although cellular domain 102 is shown as including a single mobile switching center (MSC) 106, any number of MSCs may exist in cellular domain 102. In one embodiment, the system components operating within cellular domain 102 are the same as than the components found in 2G or 3G cellular networks. MSC 106 may include any operations center that connects other phone systems (e.g., public switched telephone network (PSTN), IP phone system, etc.) to the mobile phone system.

MSC 106 is also responsible for communicating with a home location register (HLR) 110 for wireless devices originating in cellular domain 102, such as a dual-mode wireless device 108. HLR 110 may include a database (e.g., residing in a dedicated server) in a cellular system that contains subscribers within a service provider's home service area. Similarly, HLR 110 contains a plurality of subscriber profiles 124, each of which may contain a plurality of different feature data types for an associated subscriber. In one embodiment, a given subscriber profile 124 comprises an Ext-ForwFeature information element that includes a call-forward feature that is subscriber specific. Furthermore, although FIG. 1 depicts HLR 110 as being positioned outside of cellular domain 102, HLR 110 may be incorporated within cellular domain 102.

The IP domain 104 may include a communications network that supports IP telephony services, such as any area network including a local area network (LAN) or a wireless area network (WAN). In FIG. 1, IP domain 104 includes an application server 112 and convergence gateway 114. Although only one application server 112 and one convergence gateway 114 are shown in FIG. 1, any number of similar servers or gateways may exist in IP domain 104. Convergence gateway 114 may include of any computer, server, or any other device that is configured to translate between various wireless signaling protocol messages and IP domain messages. In one embodiment, convergence gateway 114, which may be embodied as a signal transfer point (STP), an SS7-IP signaling gateway (SG), or any other like network component, is adapted to receive and route call setup signaling messages (e.g., SS7 ISUP or SIP signaling messages). For example, convergence gateway 114 may be capable of translating subscriber profile data from a SIP message to a MAP message, and vice versa. In addition, convergence gateway 114 may be configured to proxy SIP REGISTER and response messages to application server 112, support MAP or ANSI-41 mobility protocols, send a MAP or ANSI-41 registration message to HLR 110, or download subscriber profile data from HLR 110. Convergence gateway 114 may also support single registration from mobile terminal devices and can update a SIP registrar.

Convergence gateway 114 may include an HLR interworking function (IWF) 116. In one embodiment, HLR IWF 116 comprises a software based function that is responsible for establishing and maintaining communications between cellular domain 102 and IP domain 104, as well as providing a synchronizing service according to one embodiment of the subject matter described herein. In one embodiment, the interface for HLR IWF 116 and application server 104 is SIP-based. Specifically, HLR IWF 116 may be supported by at least one processor (not shown) located on convergence gateway 114.

Application server 112 may be any server, personal computer, or like device that is responsible for maintaining subscriber profiles within IP domain 104. Namely, application server 112 may receive subscriber profile registrations and updates from mobile devices via convergence gateway 114. Application server 112 may also be configured to function as a virtual visitor location register (VLR) in an FMC solution. For example, when a mobile user is registered with application server 112, server 112 is capable of triggering a subscriber profile data synchronization between IP domain 104 and a cellular domain 102 to maintain the integrity of a service feature like call forwarding. In one embodiment, application server 112 may also be configured to support SIP REGISTER and response messages, save and update the local SIP registrar, and support the integrated authentication procedure. Application server 112 may also utilize a database 120 for storing subscriber profiles 126. Notably, subscriber profile 126 of a subscriber that is located with IP domain 104 will be identical to an associated subscriber profile 124 in HLR 110 upon the proper synchronization methods set forth by the present subject matter. Database 120 may reside locally on application server 112 or may be positioned externally as shown in FIG. 1.

The synchronization of subscriber data across an IP domain and a cellular domain includes two stages: the subscriber profile download registration stage and the subscriber profile update stage. In the cellular domain, a subscriber is initially registered with a particular HLR which does not change. However, if the subscriber transports a mobile device from a cellular domain to a location that is supported by an IP domain, then the mobile device must be initially registered with an application server residing in the IP domain in order for IP telephony service to be provided.

The registration of a subscriber with application server 112 may be initiated under several different "registration triggering events." A registration triggering event may include a mobile device 108 being activated in IP domain 104 or entering (i.e., roaming) into IP domain 104. For example, a subscriber with a dual-mode telephone walks into an area where a wireless LAN is available which is capable of supporting both voice and data communications. Mobile device 108 may be handed off from cellular service to the WLAN domain. Although the opposite is also possible, this scenario is more practical since it is typically more cost effective to conduct communications over the WLAN domain (versus over a cellular network).

After a registration triggering event takes place, the actual registration of the subscriber with application server 112 is initiated. For example, the registration process may involve application server 112 receiving a registration message from the subscriber's mobile device 108 via convergence gateway 114. Application server 112 then propagates the registration to the subscriber's HLR 110 (via convergence gateway 114). If the registration process is successful (as deemed by application server 112), subscriber profile 124 is downloaded from HLR 110 to convergence gateway 114. Convergence gateway 114 then converts downloaded subscriber profile 124 into a format suitable for the application server's use and "activates" the subscriber by storing the converted profile into memory or database 120.

Figure 2A:
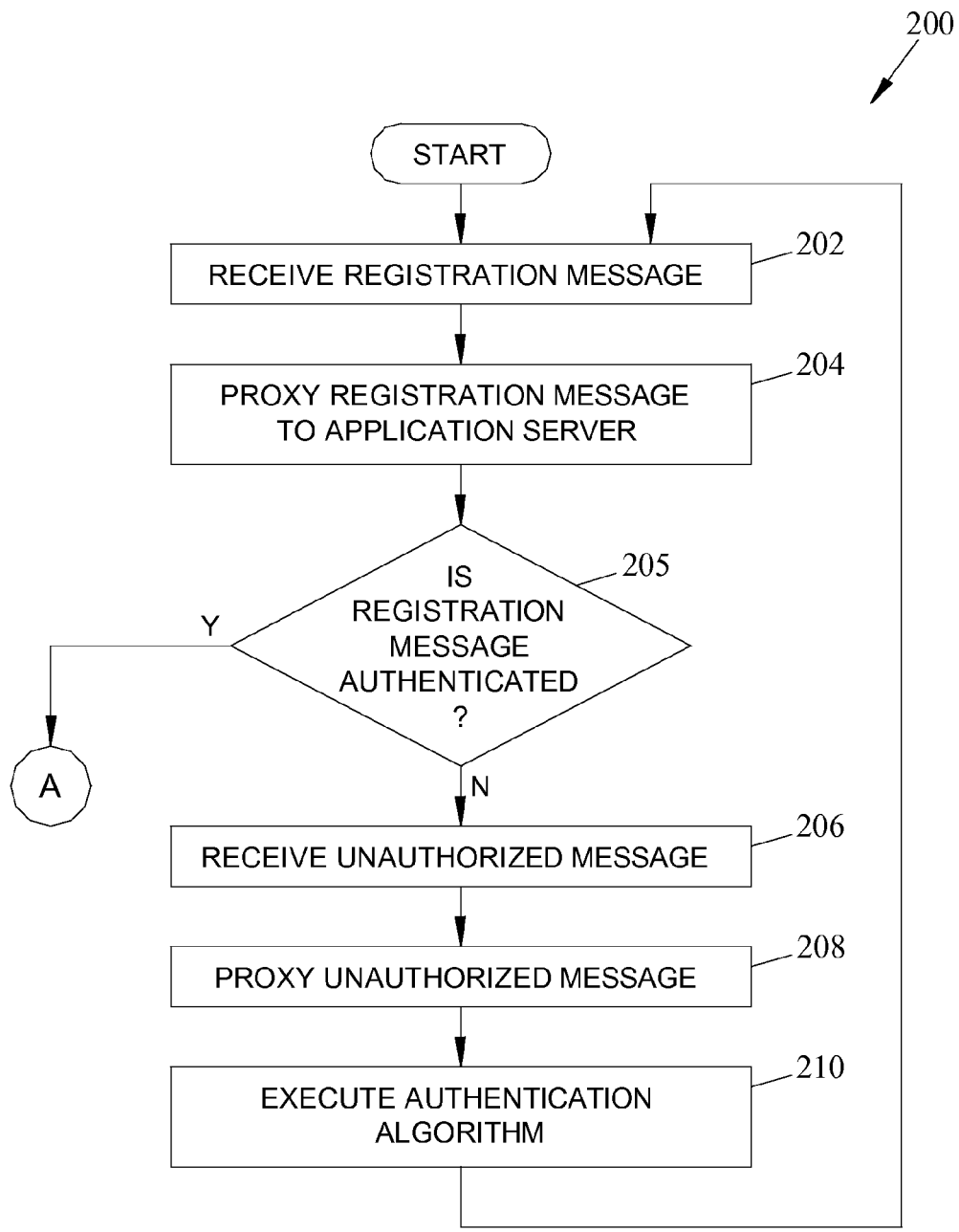
FIGS. 2A and 2B are a flow chart depicting exemplary steps for registering a subscriber profile with an application server in an IP domain according to an embodiment of the subject matter described herein.
Figure 2B:
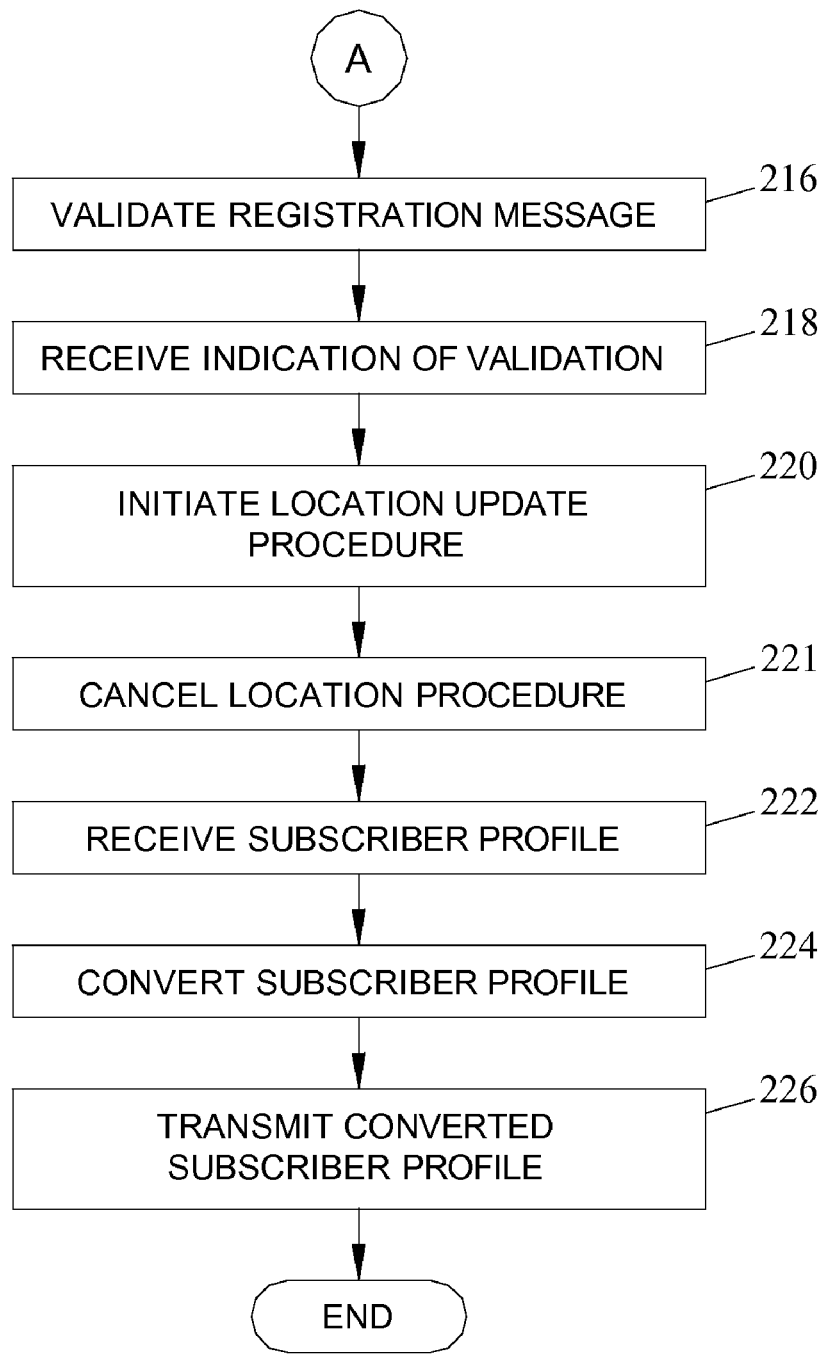

One implementation of registration and authentication of a mobile device is presented in FIGS. 2A and 2B. Specifically, FIGS. 2A and 2B are a flow chart that depicts an exemplary method 200 for registering a subscriber profile with an application server in an IP domain according to an embodiment of the subject matter described herein. In block 202, a registration message is received. In one embodiment, convergence gateway 114 receives a SIP REGISTER message from mobile device 108.

In block 204, registration message is proxied. In one embodiment, convergence gateway 114 proxies the SIP REGISTER message to application server 112. In block 205, a determination is made by application server 112 as to whether the registration message is authorized or not. If the registration message is authorized, then method 200 proceeds to block 216. Alternatively, if the registration message is not authorized, then method 200 continues to block 206.

In block 206, an unauthorized message is received. In one embodiment, convergence gateway 114 receives a "401 Unauthorized" message from application server 112. The unauthorized message may also include authentication parameters that are ultimately necessary to register/authenticate mobile device 108 with application server 112.

In block 208, the unauthorized message is proxied. In one embodiment, convergence gateway 114 proxies the "401 Unauthorized" message to mobile device 108. In block 210, an authentication algorithm is executed. In one embodiment, mobile device 108 executes an authentication algorithm using the authentication parameters previously received from application server 112.

At this time, method 200 loops back to block 202 where another registration message is received by application server 112. In one embodiment, mobile device 108 sends a second SIP REGISTER message to application server 112 via convergence gateway 114. In this instance, however, the registration message includes the requisite authentication response. Method 200 continues to block 204 where the second registration message is proxied. In one embodiment, convergence gateway 114 proxies the second SIP REGISTER message (with the requisite authentication response) to application server 112. Afterwards, method 200 continues to block 205 where a determination is made that the SIP REGISTER message is authenticated. At this point, method 200 proceeds to block 216.

In block 216, the registration message is validated. In one embodiment, application server 112 validates the SIP REGISTER message that was authenticated at block 205. In block 218, an indication of the validation is received. In one embodiment, convergence gateway 114 receives a successful indication of the validation of the SIP REGISTER message from application server 112.

In block 220, a location update procedure is initiated. In one embodiment, convergence gateway 114 initiates a location update procedure to the subscriber's HLR (e.g., HLR 110). In block 221, the subscriber's HLR performs a cancel location procedure with the previously serving MSC (e.g., MSC 106). In block 222, a subscriber profile is received. In one embodiment, convergence gateway 114 receives a download of the user's subscriber profile 124 from HLR 110. In block 224, the subscriber profile is converted. In one embodiment, convergence gateway 114 performs the necessary conversion of the subscriber profile 124 so that it may be utilized by application server 112. In block 226, the converted subscriber profile is transmitted. In one embodiment, convergence gateway 114 sends the converted subscriber profile to application server 112 via SIP signaling. The application server 112 then stores subscriber profile 126 (or modifies the existing subscriber profile into a new subscriber profile 126). Method 200 subsequently ends.

In an alternate embodiment, the authentication may be performed remotely by the original HLR. In this scenario, it is assumed that the subscriber is only registered with HLR 110. Essentially, mobile device 108 enters IP domain 104 and registers with convergence gateway 114. Convergence gateway 114 then sends the registration message to the subscriber's HLR 110, which can then authenticate the subscriber. HLR 110 downloads subscriber profile 124 to convergence gateway 114. Convergence gateway 114 then sends the downloaded subscriber profile 124 to application server 112 via SIP signaling.

Figure 3:
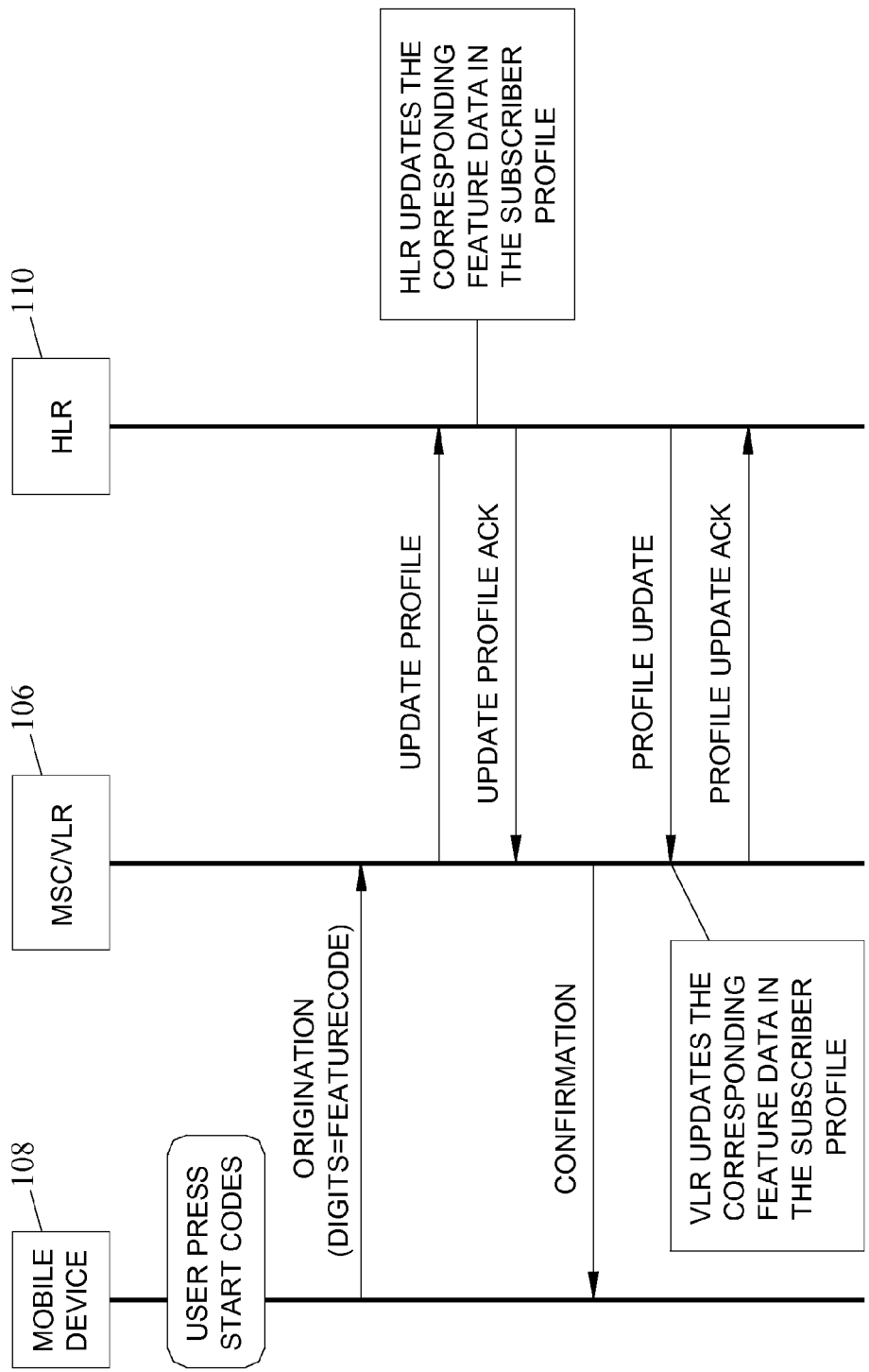
FIG. 3 is an exemplary call flow diagram depicting the updating of a subscriber profile in the cellular domain according to an embodiment of the subject matter described herein.

After subscriber profile 124 is registered with cellular domain 102 and IP domain 104, a user may necessitate an update in both domains by changing subscriber specific feature data, such as updating a call forwarding number. For example, a subscriber profile update conducted while mobile device 108 is in cellular domain 102 may be performed in a number of ways. In one embodiment as shown in FIG. 3, the profile update may be initiated by mobile device 108 sending an origination message to an associated MSC 106 (e.g., in response to a user pressing a start code on the mobile device 108). MSC 106 subsequently detects the inclusion of a feature code in the origination message and initiates an update of the subscriber's profile with HLR 110. After updating subscriber profile 124, HLR 110 notifies MSC 106 upon the successful update of the subscriber profile. MSC 106, in turn, then notifies mobile device 108 of the successful update procedure. HLR 110 then updates the subscriber profile in a VLR associated with the area mobile device 108 is located in. In one embodiment, subscriber data updates are carried in a GSM MAP message to the VLR. An exemplary MAP message may include the following subscriber profile data.

```
SubscriberData ::= SEQUENCE {
msisdn                              [1] ISDN-AddressString OPTIONAL,
category                            [2] Category OPTIONAL,
```

| | |
|---|---|
| subscriberStatus | [3] SubscriberStatus OPTIONAL, |
| bearerServiceList | [4] BearerServiceList OPTIONAL, |
| teleserviceList | [6] TeleserviceList OPTIONAL, |
| provisionedSS | [7] Ext-SS-InfoList OPTIONAL, |
| odb-Data | [8] ODB-Data OPTIONAL, |
| roamingRestrictionDueToUnsupportedFeature | [9] NULL OPTIONAL, |
| regionalSubscriptionData | [10] ZoneCodeList OPTIONAL, |
| vbsSubscriptionData | [11] VBSDataList OPTIONAL, |
| vgcsSubscriptionData | [12] VGCSDataList OPTIONAL, |
| vlrCamelSubscriptionInfo | [13] VlrCamelSubscriptionInfo OPTIONAL |
| Ext-SS-InfoList ::= SEQUENCE SIZE (1..maxNumOfSS) OF Ext-SS-Info | |
| Ext-SS-Info ::= CHOICE { | |
| forwardingInfo | [0] Ext-ForwInfo, |
| callBarringInfo | [1] Ext-CallBarInfo, |
| cug-Info | [2] CUG-Info, |
| ss-Data | [3] Ext-SS-Data, |
| emlpp-Info | [4] EMLPP-Info} |
| Ext-ForwInfo ::= SEQUENCE { | |
| ss-Code SS-Code, | |
| forwardingFeatureList | Ext-ForwFeatureList, |
| extensionContainer | [0] ExtensionContainer } |
| Ext-ForwFeatureList ::= SEQUENCE SIZE (1..maxNumOfExt- BasicServiceGroups) OF Ext-ForwFeature | |
| Ext-ForwFeature ::= SEQUENCE { | |
| basicService Ext-BasicServiceCode OPTIONAL, | |
| ss-Status | [4] Ext-SS-Status, |
| forwardedToNumber | [5] ISDN-AddressString OPTIONAL, |
| forwardedToSubaddress | [8] ISDN-SubaddressString OPTIONAL, |
| forwardingOptions | [6] Ext-ForwOptions OPTIONAL, |
| noReplyConditionTime | [7] Ext-NoRepCondTime OPTIONAL, |
| extensionContainer | [9] ExtensionContainer OPTIONAL, |
| ..., | |
| longForwardedToNumber | [10] FTN-AddressString OPTIONAL } |

In contrast to the single domain subscriber profile update procedure detailed above, the present subject matter may utilize an application server in IP domain 104 to function as a VLR along with a mediation device (e.g., convergence gateway 112) to update the subscriber profile across multiple domains. Similar to a VLR in the cellular domain, application server 112 (in conjunction with HLR IWF 116) behaves like a VLR for the IP domain. Application server 112 is responsible for providing the supplementary services provisioned for a subscriber in HLR 110. In addition to the supplementary services, application server 112 provides value added services to the subscriber (e.g. Find me, click to dial, etc.) using the profile extension configured in the local database for the subscriber.

A subscriber is in an IP/WiFi domain conveys its location by performing a SIP registration towards application server 112, which is the SIP Registrar and Authentication server. HLR 110 is updated with the new MSCNLR address, and the profile data for the subscriber is downloaded from HLR 110 (similar to a VLR). This profile data for the subscriber is acquired by application server 112 and stored in the local database for subscription validation for both the originating and terminating supplementary services.

Deregistration of the handset-client in the WiFi domain using the cellular location cancellation procedure is also supported by application server 112. In one embodiment, application server 112 monitors the communication (via keep-alive) to the handset-client and triggers a loss of contact with the handset-client. It informs HLR 110 (via HLR IWF 116) to mark its data so that any request for routing information (terminating calls) for the subscriber is treated as if the handset-client is not reachable.

In one embodiment, all the voice call originations in the IP/WiFi domain are received by application server 112, which validates the features of a subscriber using the stored subscription/profile data, and provides call origination services. Similarly, when a call terminates to a subscriber currently being served in the IP/WiFi domain, the call is routed to application server 112 for subscription validation and the terminating supplementary services.

Figure 4:
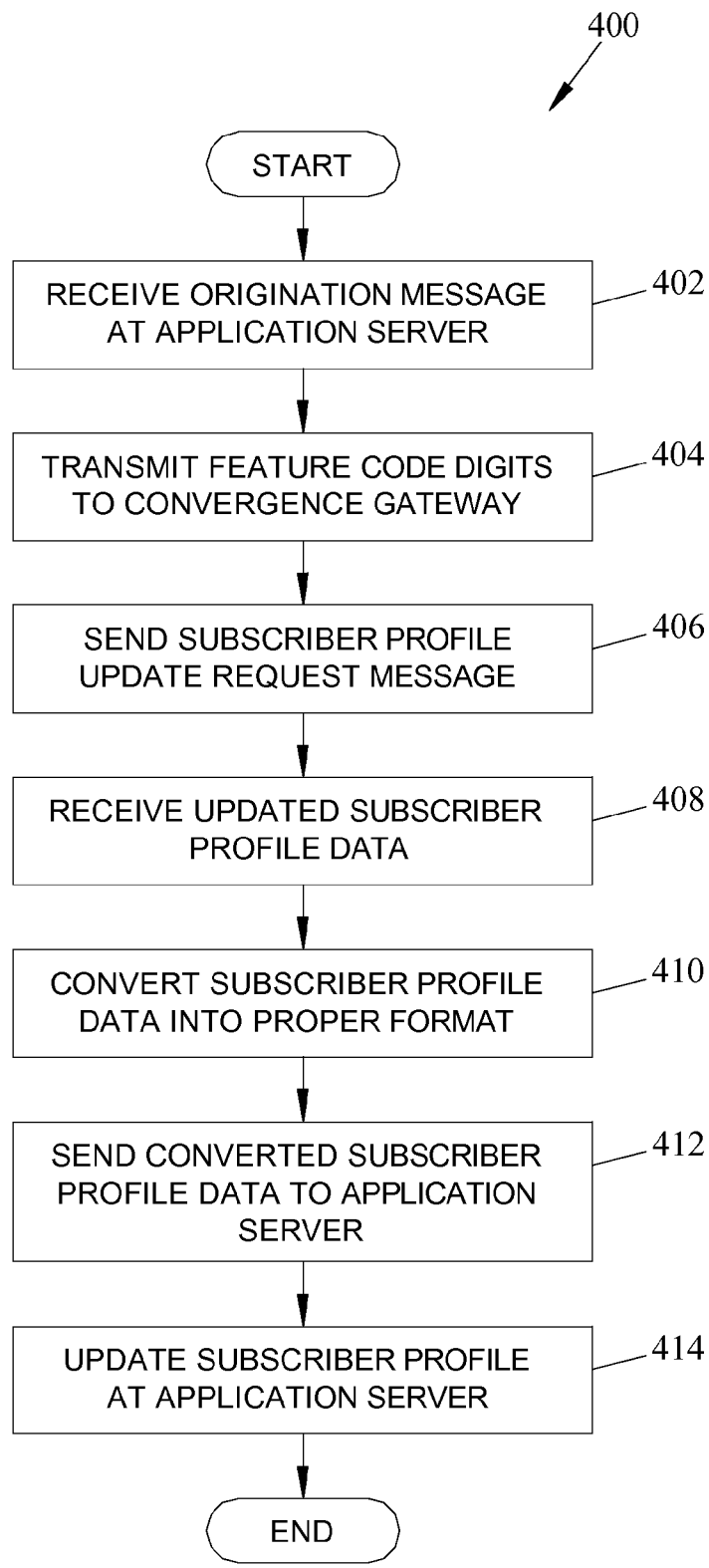
FIG. 4 is a flow chart depicting exemplary steps for updating a subscriber profile at an application server in an IP domain according to an embodiment of the subject matter described herein.

One particular embodiment is illustrated in FIG. 4. More specifically, FIG. 4 is a flow chart that depicts an exemplary method 400 for synchronizing a subscriber profile between multiple domains according to an embodiment of the subject matter described herein. Method 400 begins at block 402 where an origination message is received at an application server. In one embodiment, a mobile user presses a start code, which corresponds with a service feature data change, on mobile device 108. The service feature change may include but is not limited to configuring call waiting or call forwarding feature, turning a call-block feature on and off, and the like. In response, mobile device 108 transmits an origination message to application server 112, which functions as a VLR in this exemplary embodiment.

In block 404, feature code digits are transmitted. In one embodiment, application server 112 sends feature code digits to convergence gateway 114. The transmitted feature codes digits correspond to a particular subscriber feature change that was requested in the previously received origination message.

In block 406, a subscriber profile update request message is transmitted. In one embodiment, convergence gateway 114 initiates a subscriber profile update with HLR 110 using suitable cellular network messaging, such as a mobile application part (MAP) protocol.

In block 408, updated subscriber profile data is received. In one embodiment, convergence gateway 114 receives a subscriber profile update from HLR 110 after subscriber profile 124 is successfully updated (on the HLR). The profile update may be transmitted using the same (or different) appropriate cellular network messaging (e.g., SIP messaging). In one embodiment, the subscriber profile update may include the entire updated subscriber profile. Alternatively, the subscriber profile update may only include the changes made to the subscriber profile (e.g., a modified portion of subscriber profile 124). In block 410, subscriber profile data is converted into a proper format. In one embodiment, convergence gateway 114 converts the subscriber profile data into a compatible format for transfer to application server 112. The format may include any form that is recognized by application server 112.

In block 412, the converted subscriber profile data is transmitted. In one embodiment, the converted subscriber profile data may be transferred from convergence gateway 114 to application server 112 via SIP signaling. In block 414, the subscriber profile is updated. In one embodiment, application server 112 updates the subscriber profile 126 in accordance to the newly received subscriber profile data (i.e., subscriber profile 126 now includes the originally requested service feature change). As mentioned previously, the subscriber profile data may include a modification to the subscriber profile 126 or alternatively, an entire replacement of subscriber profile 126. After the profile 126 is updated, application server 112 may also notify mobile device 108 of the successful update of the feature data change. Method 400 then ends.

Upon the completion of method 400, both application server 112 (which is in IP domain 104) and HLR 110 (which is responsible for cellular domain 102) are similarly updated with the same subscriber profile (i.e., subscriber profile 124 and 126 contain the same data). Once mobile device 108 is moved back to cellular domain 102, HLR 110 will contain the subscriber profile change that was made in IP domain 104. Thus, the user of mobile device 108 is relieved from repeating the subscriber profile change.

Figure 5:
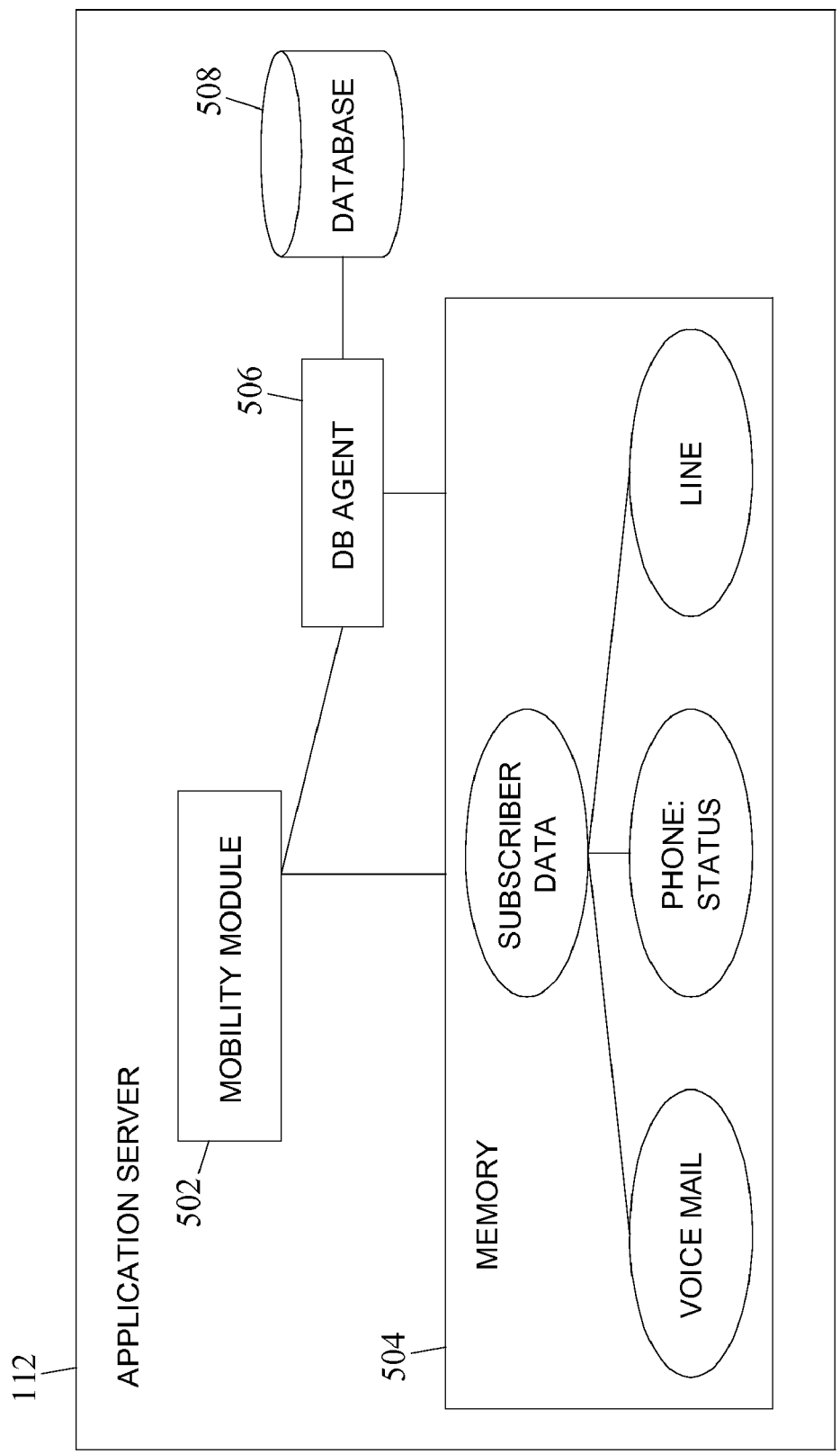
FIG. 5 is a block diagram of an exemplary application server being utilized as a visitor location register (VLR) according to an embodiment of the subject matter described herein.

As mentioned above, application server 112 may be used as a VLR. For example, FIG. 5 illustrates a logical depiction of application server 112 that is implemented as a VLR in an IP domain (e.g., IP domain 104 as shown in FIG. 1). In contrast to traditional application servers, application server 112, which is combined with VLR functions, includes a mobility module 502 that manages the feature interaction and interfaces with the cellular domain. In one embodiment, application server 112 is able to monitor for triggers that may cause subscriber data synchronization across multiple domains. Similarly, application server 112 may interface between the external SIP messages and internal components. For example, application server 112 translates SIP messages containing subscriber profile data in XML format into a database entry so the data can be stored into database 508 (or an external database 120 as shown in FIG. 1) when a subscriber profile is downloaded from a remote HLR.

In one embodiment, mobility module 502 interfaces the components in system memory 504 that represent a subscriber and the associated feature to monitor for the trigger conditions for data synchronization and update the subscriber data in memory 504 on an "as needed" basis. In one embodiment, the triggering criteria for subscriber data synchronization may include, but is not limited to the following events: change to feature data like subscriber call-forward-to number, turn on/off call-blocking, and call waiting/forwarding.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for synchronizing a subscriber profile in a plurality of domains, the method comprising steps of:
registering a Wi-Fi-enabled dual-mode mobile device at an application server in an Internet protocol (IP) domain, wherein registering the Wi-Fi-enabled dual-mode mobile device includes: authenticating a wireless subscriber associated with the Wi-Fi-enabled dual-mode mobile device, downloading data corresponding to the wireless subscriber from a home location register (HLR) located in a cellular domain distinct from the IP domain, and generating an IP domain subscriber profile using the downloaded data;
receiving, at the application server located in the IP domain, a profile update request message from the Wi-Fi-enabled dual-mode mobile device operating in Wi-Fi mode and located in the IP domain, to modify the IP domain subscriber profile associated with the Wi-Fi-enabled dual-mode mobile device, wherein the profile update request message specifies a service feature change, and wherein receiving the profile update request message includes receiving the profile update request message via the IP domain;
forwarding the profile update request message to the HLR;
modifying, by the HLR, a cellular domain subscriber profile associated with the Wi-Fi-enabled dual-mode mobile device in accordance with the profile update request message, wherein modifying the cellular domain subscriber profile associated with the Wi-Fi-enabled dual-mode mobile device includes modifying a service feature of the cellular domain subscriber profile in accordance with the specified service feature change;
receiving updated subscriber profile data from the HLR;
converting the updated subscriber profile data in the IP domain; and
sending the converted updated subscriber profile data to the application server.

2. The method of claim 1 comprising:
updating the IP domain subscriber profile in the application server using the converted updated subscriber profile data.

3. The method of claim 1, wherein the registering step is initiated by a registration triggering event.

4. The method of claim 3, wherein the registration triggering event comprises activating the Wi-Fi-enabled dual-mode mobile device in the IP domain.

5. The method of claim 3, wherein the registration triggering event comprises the Wi-Fi-enabled dual-mode mobile device entering the IP domain.

6. A system for synchronizing a subscriber profile in a plurality of domains, comprising:
an application server, located in an Internet protocol (IP) domain, for:
registering a Wi-Fi-enabled dual-mode mobile device, wherein registering the Wi-Fi-enabled dual-mode mobile device includes: authenticating a wireless subscriber associated with the Wi-Fi-enabled dual-mode mobile device, downloading data corresponding to the wireless subscriber from a home location register (HLR) located in a cellular domain distinct from the IP domain, and using the downloaded data to generate a first subscriber profile associated with the Wi-Fi-enabled dual-mode mobile device for use in the IP domain;
storing the first subscriber profile associated with the Wi-Fi-enabled dual-mode mobile device for use in the IP domain; and receiving a profile update request message from the Wi-Fi-enabled dual-mode mobile device to modify the first subscriber profile, wherein the profile update request message specifies a service feature change, and wherein receiving the profile update request message includes receiving the profile update request message via the IP domain from the Wi-Fi-enabled dual-mode mobile device operating in Wi-Fi mode;

the HLR, for updating a second subscriber profile associated with the Wi-Fi-enabled dual-mode mobile device for use in the cellular domain, wherein updating the second subscriber profile includes using data from the profile update request message to modify a service feature of the second subscriber profile in accordance with the specified service feature change; and a convergence gateway for receiving the profile update request message, forwarding the data from the profile update request message to the HLR, receiving updated subscriber profile data from the HLR, converting the updated subscriber profile data, sending the converted updated subscriber profile data to the application server, and using the converted updated subscriber profile data to modify the first subscriber profile to mirror the second subscriber profile.

7. The system of claim 6, wherein the registering of the Wi-Fi-enabled dual-mode mobile device is initiated by a registration triggering event.

8. The system of claim 7, wherein the registration triggering event comprises activating the Wi-Fi-enabled dual-mode mobile device in the IP domain.

9. The system of claim 7, wherein the registration triggering event comprises the Wi-Fi-enabled dual-mode mobile device entering the IP domain.

10. The system of claim 6, wherein the application server functions as a visitor location register (VLR) for the IP domain.

11. A non-transitory computer readable medium comprising computer executable instructions that when executed by a processor of a computer control the computer to perform steps comprising:

registering a Wi-Fi-enabled dual-mode mobile device at an application server in an Internet protocol (IP) domain, wherein registering the Wi-Fi-enabled dual-mode mobile device includes: authenticating a wireless subscriber associated with the Wi-Fi-enabled dual-mode mobile device, downloading data corresponding to the wireless subscriber from a home location register (HLR) located in a cellular domain distinct from the IP domain, and generating an IP domain subscriber profile using the downloaded data;

receiving, at the application server located in the IP domain, a profile update request message from the Wi-Fi-enabled dual-mode mobile device operating in Wi-Fi mode and located in the IP domain, to modify the IP domain subscriber profile associated with the Wi-Fi-enabled dual-mode mobile device, wherein the profile update request message specifies a service feature change, and wherein receiving the profile update request message includes receiving the profile update request message via the IP domain;

forwarding the profile update request message to the HLR;

modifying, by the HLR, a cellular domain subscriber profile associated with the Wi-Fi-enabled dual-mode mobile device in accordance with the profile update request message, wherein modifying the cellular domain subscriber profile associated with the Wi-Fi-enabled dual-mode mobile device includes modifying a service feature of the cellular domain subscriber profile in accordance with the specified service feature change;

receiving updated subscriber profile data from the HLR;

converting the updated subscriber profile data in the IP domain; and sending the converted updated subscriber profile data to the application server.

12. The non-transitory computer readable medium of claim 11 comprising:

updating the IP domain subscriber profile in the application server using the converted updated subscriber profile data.

13. The non-transitory computer readable medium of claim 11, wherein the registering step is initiated by a registration triggering event.

14. The non-transitory computer readable medium of claim 13, wherein the registration triggering event comprises activating the Wi-Fi-enabled dual-mode mobile device in the IP domain.

15. The non-transitory computer readable medium of claim 13, wherein the registration triggering event comprises the Wi-Fi-enabled dual-mode mobile device entering the IP domain.

* * * * *